FIG.4

Sept. 23, 1969  R. P. OGDEN ET AL  3,469,067
APPARATUS FOR WELDING TOGETHER BEAM COMPONENTS
Filed Sept. 19, 1966  5 Sheets-Sheet 4

INVENTORS.
RALPH P. OGDEN
WILLIAM P. LAWSON
BY
Mann, Brown, & McWilliams
ATTORNEYS

United States Patent Office 3,469,067
Patented Sept. 23, 1969

3,469,067
APPARATUS FOR WELDING TOGETHER
BEAM COMPONENTS
Ralph P. Ogden and William P. Lawson, Hammond, Ind.,
assignors to Ogden Engineering Corporation, Schererville, Ind., a corporation of Indiana
Filed Sept. 19, 1966, Ser. No. 580,314
Int. Cl. B23k 9/12
U.S. Cl. 219—124                        8 Claims

ABSTRACT OF THE DISCLOSURE

The disclosure relates to a method and apparatus for welding together the end flanges and webs of girder forming I-beams, box beams and the like, in which one or more webs are placed on top of one of the end flanges, and the thus associated beam components are simultaneously moved past floating welding heads at a welding station that fillet weld the web or webs to the end flange. These beams components are positioned in their normal load supporting positions for this welding operation, that is, the web and end flange are respectively vertically and horizontally disposed, and they are clamped together adjacent the welding heads by a roller type clamping arrangement that also floats. The beam components pass to and from the welding station on roller conveyors, and on being fillet welded together form a beam subassembly that is returned to the initial assembly position, inverted, and placed on top of the other end flange, and the thus assembled beam components are again passed through the welding station to complete fabrication of the beam.

---

This invention relates to a method and apparatus for welding beam components together, and more particularly, to apparatus for welding together the end flanges and webs of girder forming I-beams, box beams, or the like.

Conventional methods of welding beam components together call for the fitting and tack welding of the beam components, after which the components are permanently welded together by a separate welding procedure. In the case of I-beams, for instance, the end flanges and webs are tack welded in place, and then welders, using semi-automatic welding equipment, go over the beam to make the fillet welds and the like that permanently fix the beam parts together. In practicing these procedures, the beam components remain stationary and the welding equipment is moved along the fillet or the like.

Lindmark Patent 3,159,129 discloses a variation from conventional procedures in providing a welding arrangement in which the welding apparatus remains stationary and the beam components are moved past it. However, the Lindmark arrangement requires that the I-beam be placed on its side (that is, the web is to be disposed horizontally) which is not satisfactory as the molten metal which results from the welding arc can burn through the relatively thin web plate, and the action of gravity on the web causes a camber problem that is difficult to compensate for.

A principal object of our invention is to provide a method and apparatus for welding together components of I-beams and the like which permits the elimination of tack welding and provides for the feeding of the beam components past the welder in the position the end flanges and webs will be disposed in normal use, that is, with the webs vertically disposed and the end flanges horizontally disposed.

Another principal object of the invention is to provide a method and apparatus for welding beam webs and end flanges together of the type indicated wherein the web and end flange being welded are securely clamped together at the welding position by a floating device which accommodates the camber that is usually built into a web, with the welding heads floating with the web and flange.

Still another principal object of the invention is to provide apparatus for automatically welding beam webs and end flanges together which accommodates a wide variety of beam sizes as well as variations in the width of the end flange.

Other objects of the invention are to provide a method of welding beam components together which eliminates much of the preliminary handling and tack welding heretofore required, to provide apparatus for welding beam components together that permits the use of automatic welding equipment for such purposes, and to provide apparatus of the type indicated that is economical of manufacture, convenient to install and use, and adaptable to welding a wide variety of beam sizes and end flange shapes.

Other objects, uses, and advantages will be obvious or become apparent from a consideration of the following detailed description and the application drawings.

However, it is to be distinctly understood that the specific drawing illustrations provided are supplied primarily to comply with the requirements of the Patent Code and that the invention may have other specific embodiments that will be obvious to those skilled in the art.

GENERAL DESCRIPTION

Reference numeral 10 generally indicates a diagrammatically illustrated arrangement illustrating the principal features of the illustrated embodiment of this invention, which comprises an entry roller conveyor 12, and an exit roller conveyor 14 that are separated by a beam plate guiding and holding assembly arrangement generally indicated at 16, which arrangement comprises the welding station of the apparatus.

The apparatus 16 comprises a pair of knurled supporting and driving rollers 18 and 20, which may be powered to rotate in the direction of movement that is to be taken by the beam plates that are to be welded together (indicated by arrow 22).

Figures 1, 2, 2A:
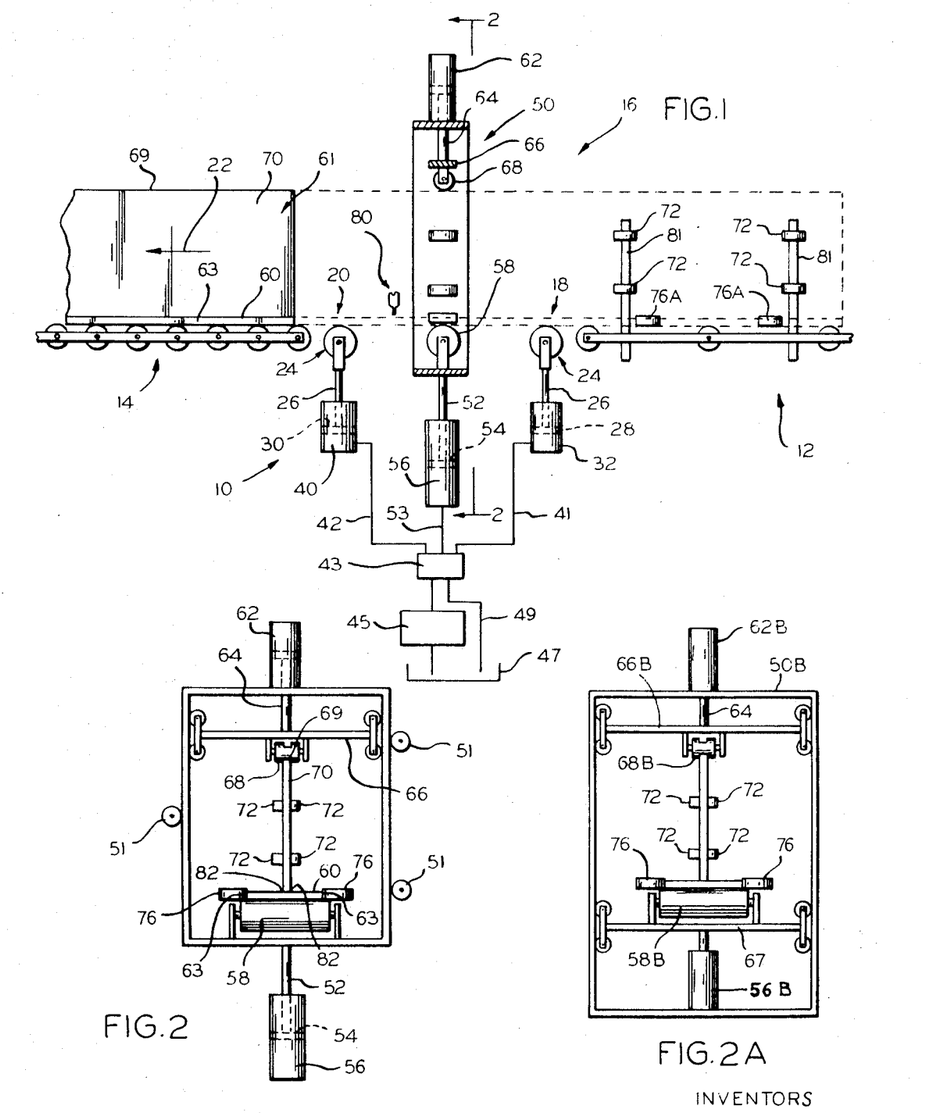
FIGURE 1 is a side elevational view diagrammatically illustrating one embodiment of the apparatus comprising our invention, partially in section and partially in block diagram form.
FIGURE 2 is an end elevational view of the floating yoke or frame of our apparatus, taken substantially along line 2—2 of FIGURE 1.
FIGURE 2A is a view similar to that of FIGURE 2 but showing a modified embodiment of the invention.

The rollers 18 and 20, in the form illustrated in FIGURES 1 and 2, are shown journalled in suitable bearing arrangements 24 which are respectively mounted on top of piston rods 26 of the respective pistons 28 and 30 that are received in the usual hydraulic piston-cylinder arrangement in the respective cylinders 32 and 40 that may be fixedly mounted in any suitable manner on suitable fixed supports.

The cylinders 32 and 40 are filled with hydraulic liquid under their respective pistons 28 and 30, and are connected by conduits 41 and 42, respectively, to a control valve device 43 that is supplied with hydraulic liquid by a suitable pump 45 drawing same from tank 47.

Pump 45 may be any suitable variable displacement pump that provides hydraulic liquid under pressure to the respective cylinders 32 and 40 under the control of valve device 43 when rollers 18 and 20 are to be raised, and valve device 43 is also provided with a suitable connection for discharging hydraulic liquid from under pistons 28 and 30, respectively, through the valve 43 and back to tank 47 through suitable conduit 49.

Interposed between the drive rollers 18 and 20 is a floating yoke or frame structure 50 supported by piston rod 52 of a piston 54 operatively received within suitable hydraulic cylinder 56 that in turn is fixedly mounted on a suitable support.

The yoke or frame structure 50 is suitably guided for vertical movement under the action of hydraulic cylinder 56, as by the diagrammatically illustrated guide rollers 51 that are journalled in a suitable guiding framework (not shown in this figure) and the yoke or frame structure 50 journals a roller 58, which may also be driven in the same direction as rollers 18 and 20, and which is intended to be moved into substantial vertical alignment with the path of movement of an I-beam end flange 60 moving over the roller conveyor 12 toward the roller conveyor 14. This is done by suitable operation of the hydraulic cylinder 56, which, in the embodiment shown, is hydraulically connected to valve device 43 through conduit 53, it being understood that valve device 43 provides a connection between pump 45 when it is desired to raise the floating yoke, and it is also arranged to provide appropriate connection with discharge line 49 when it is desired to lower the floating yoke or to permit it to float as the beam components are fed through it (as hereinafter described).

The yoke or frame structure 50 also carries a vertically disposed hydraulic cylinder 62 on its upper end from which extends a piston rod 64 that is operably connected to a bridge structure 66 that journals a roller 68 which is intended to engage the top edge 69 of an I-beam web 70 (or the top surface of a previously welded flange) as it moves between the conveyors 12 and 14.

Floating yoke or frame 50 also has secured thereto opposed pairs of web engaging rollers 72 for guiding the movement of the web (and keeping it centered in the yoke and holding it from buckling), and a pair of rollers 76 for engaging the side edges 63 of the end flanges 60. Operably associated with the rollers 76 is an equalizer mechanism of the general type shown in FIGURES 5–7 for insuring that the rollers 76 simultaneously and equally follow variations in the width of the end flange 60 while maintaining the flange centered laterally of the yoke so that the web remains properly centered on the flange (assuming the centered position is that desired).

In operation, an I-beam end flange 60, having a web 70 positioned in I-beam defining configuration thereon, but lacking the top end flange, is placed on the conveyor 12. While a light tack weld may be applied to the leading ends of the assembled end flange and web to hold them together, we prefer to provide a series of web engaging rollers 72 along conveyor 12 to hold the web upright, and this eliminates the need for a tack weld as the weight of the web will be sufficient to hold it in place on the flange at normal welding speeds.

The flange and web then form a subassembly 61 which is then conveyed or moved toward the apparatus 16 in any suitable manner. The driving rollers 18 and 20 should be positioned by operating valve device 43 (and before they are engaged by the end flange 60) to initially have their upper peripheral portions disposed somewhat below the rollers of roller conveyors 12 and 14. In achieving this positioning, it is desirable that the valve device 43 be arranged so that conduits 41 and 42 will not be in common communication with each other at this point in the operation of the system, and this lack of common communication should continue until the weight of the beam subassembly 61 is resting on both the rollers 18 and 20.

Likewise, the yoke or frame 50 should be positioned so that the upper peripheral portion of roller 58 has an elevation that is similar to that of the corresponding portions of rollers 18 and 20, and roller 68 should be positioned to have the underportion of its periphery near substantial alignment with the top edge 69 of the web 70.

As the leading ends of the beam web and end flange move onto and over the respective rollers 18, 58 and 20, hydraulic cylinders 32, 56 and 40 are actuated to dispose rollers 18, 58 and 20 against the end flange with sufficient force to bias the end flange toward the web. As the subassembly 61 moves onto roller 58, cylinder 62 is actuated to press the roller 68 into firm engagement with the upper edge 69 of web 70, which together with the action of cylinder 56, holds the end flange 60 firmly in engagement with the web 70 as the web and end flange are thus clamped between the rollers 68 and 58 (due to the vertical stiffness of the web and the comparative flexibility of the end flange in the same direction, the end flange bends to conform to the web as the subassembly 61 moves through yoke 50). Also at the time subassembly 61 reaches roller 58, valve 43 is operated to open hydraulic cylinder 56 to tank so that yoke 50 becomes free floating; in this connection, we prefer that the hydraulic circuiting to hydraulic cylinder 56 include a relieving type regulating valve (not shown) which permits cylinder 56 to sufficiently support yoke 50 to off-set its weight when cylinder 56 is connected to tank under the conditions indicated while still permitting the yoke to float vertically (the hardware necessary and arrangement thereof can be readily assembled by those familiar with the hydraulic arts).

The welding heads, which are located approximately where indicated by the arrow 80 of FIGURE 1 and are carried by yoke 50 through a floating guidance and support arrangement similar to the type disclosed in our application Ser. No. 323,820, filed Nov. 14, 1963, now Patent No. 3,325,625, granted June 13, 1967 (the disclosure of which is hereby incorporated herein by this reference), are ignited and proceed to perform their welding function as beam subassembly 61 continues to move through the floating yoke or frame 50 and onto and across roller 20 thence to conveyor 14. The welding heads 80 thus exactly follow the contours of fillets they are to weld.

The welding heads themselves may be conventional and are not illustrated in detail in these drawings, but it is to be understood that they may be supported by yoke 50 in any suitable manner, and, where fillet welding is required (as in the illustrated arrangements), they should comprise appropriate fillet welding heads disposed and arranged to be directed at the fillets 82 that are defined by the end flange 60 and the web 70 (see FIGURE 2).

After the weight of the I-beam components rests on both the rollers 18 and 20, conduits 41 and 42 of cylinders 32 and 40 are placed in communication with each other, though shut off from pump 45 and tank 47, with the result that the rollers 18 and 20 tend to float up and down in a self-compensating manner as the I-beam components move between conveyors 12 and 14, which permits the apparatus 16 to accommodate the beam flange thickness variations and beam camber.

The floating capability of yoke 50 results in the yoke following the camber of the beam components with the results that the welding heads (which are carried by the yoke and have their own floating relation with the fillets to be welded) are maintained in good fillet welding position, and apparatus 16 accommodates the camber of the web without having to overcome the web's camber to get the close fit that is required for good welding results.

As the beam components leave roller 18, cylinders 32 and 40 are switched back into independent operation and roller 20 is maintained to support the beam components near their ends until the welding operation is completed.

Furthermore, the laterally acting equalizing action on rollers 76 permits the apparatus 16 to accommodate I-beam components in which the end flange varies in width longitudinally of the beam, as occasionally is provided for in I-beam design.

The rollers 72 that are not on yoke 50 are mounted on suitable supports 81 which preferably are arranged in any suitable manner to be retractable (e.g., to a horizontal position) below the top of conveyor 12 so that the beam components can be loaded on conveyor 12 from one side thereof (as by using an overhead crane), and which are arranged in any suitable manner to be clamped against the web to hold it upright.

Alternately yoke 50 may be fixed against vertical movement (see yoke 50B of FIGURE 2A) and rollers 58 and 68 arranged to float within yoke 50B to provide the floating action heretofore described. In such an arrangement (see FIGURE 2A) cylinder 56B is interposed between roller 58B and yoke 50B and is hydraulically connected as already described in connection with cylinder 56 except that cylinder 56B now need only maintain the beam components clamped together. Cylinder 62B is operated in a manner similar to that described in connection with cylinder 56 to permit rollers 68B and 58B to float in accommodating the camber of the beam components (except of course the weight of yoke 50 is not involved and cylinder 62B need only clampingly oppose the action of cylinder 56B). In this arrangement, the welding heads 80 (not shown) should be supported in welding position by bridge structure 67 (using a floating guidance and support arrangement of the type disclosed in our said application Ser. No. 323,820) so that they float with the fillets they are to weld, and the rollers 72 and 76 at yoke 50B are mounted on suitable supports (not shown) carried by bridge structure 67 that permit relative movement between bridge structures 66B and 67.

The welding operation proceeds continuously and automatically until the beam subassembly 61 has moved through floating yoke or frame 50, after which the welding heads are shut off. The subassembly 61 is manipulated in any suitable manner, as by employing an overhead crane, to bring it back to the conveyor 12 and apply it thereto in a turned over or inverted position on top of the other end flange that is to be welded to web 70. The whole unit is then moved through the floating yoke or frame structure 50 to complete the welding of the second end flange to the web in the manner already indicated with respect to the first flange.

SPECIFIC DESCRIPTION

Turning now to the showing of FIGURES 3–9, which illustrate a specific embodiment of the apparatus 16 shown in FIGURES 1 and 2, reference numeral 100 illustrates the beam plate components and guiding and holding apparatus including the knurled support rollers 18A and 20A, which are mounted for rotation on beams 102 and 104, respectively, that are in turn each supported by hydraulic piston and cylinder arrangement comparable to the devices that support the rollers 18 and 20 of FIGURE 1.

Interposed between the drive rollers 18A and 20A is yoke or frame structure 50A (see FIGURE 4) that is mounted on piston rod 52A of cylinder 54A positioned on suitable abutment 106 resting on floor 108.

Figure 4:
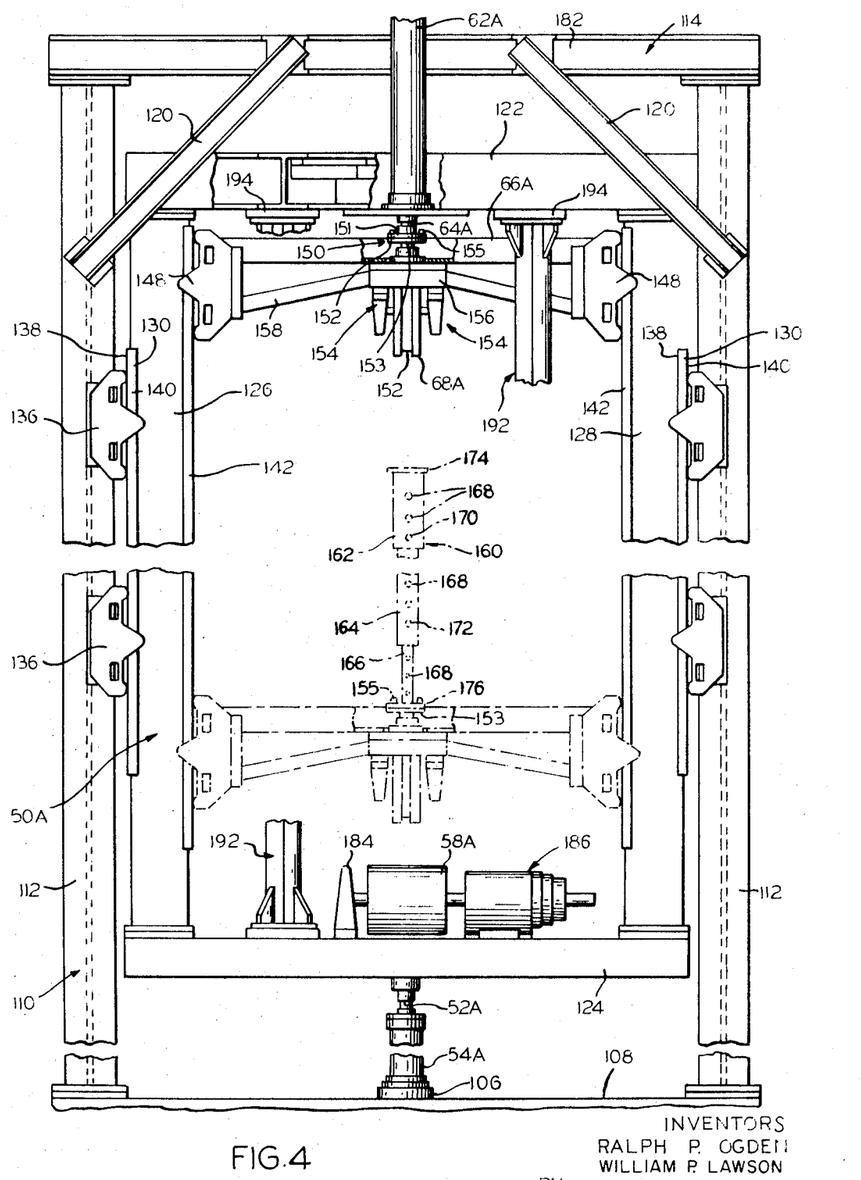
FIGURE 4 is an end view similar to that of FIGURE 2 and taken substantially along the line 4—4 of FIGURE 3.

The yoke or frame 50A is mounted within a suitable framework generally indicated at 110, which comprises a pair of vertically disposed support posts or beams 112 connected together across their tops by brace beam 114 and braced on either side thereof by suitable bracing structures 116 and 118 (which have been omitted from the showing of FIGURE 4).

The top beam 114 and the side beams 112 are further reinforced by suitable cross braces 120 (see FIGURE 4).

Figure 3:
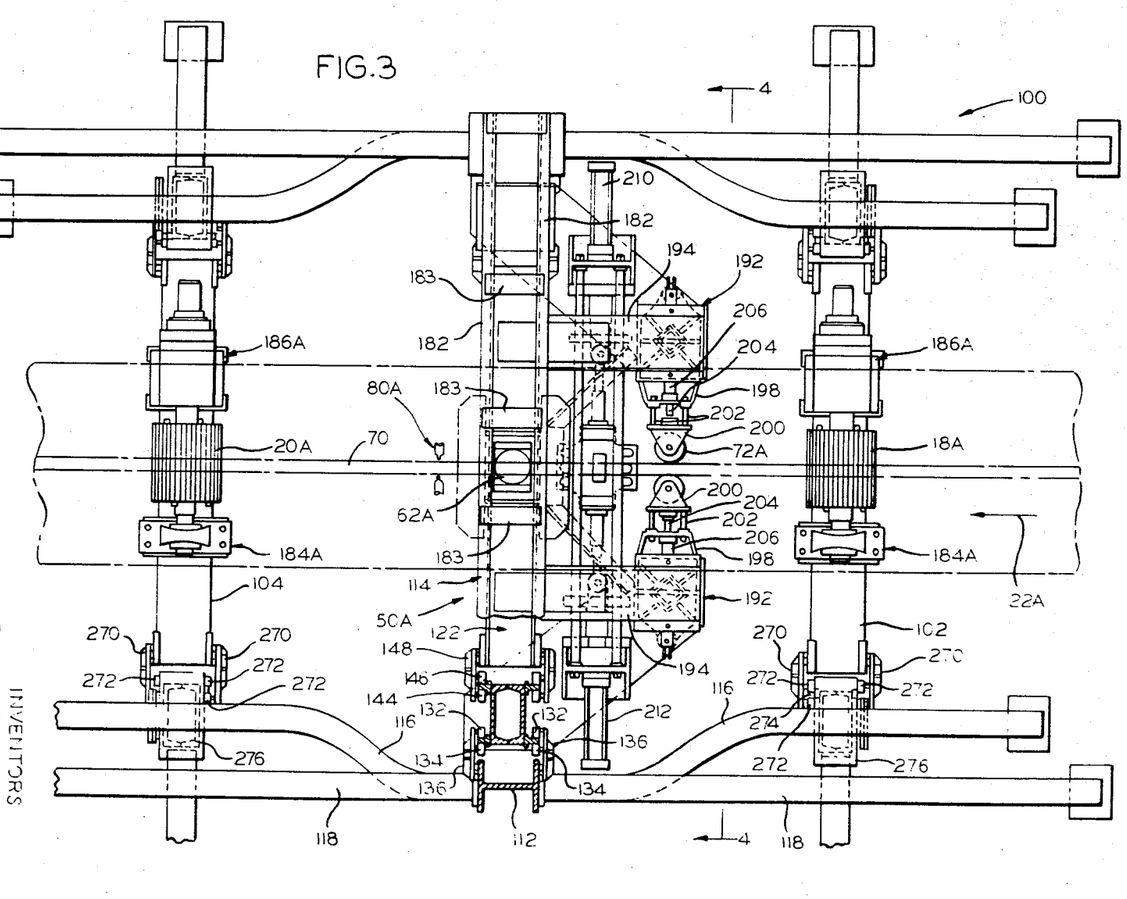
FIGURE 3 is a plan view, on a somewhat enlarged scale, of a specific embodiment of the invention embodying the features diagrammatically illustrated in the showing of FIGURES 1 and 2.

The frame or yoke 50A comprises top and bottom beams 122 and 124 affixed together by vertically disposed side beams 126 and 128. The edges of beams 126 and 128 that are adjacent the respective beams 112 are provided on opposite sides thereof with roller guide bars 130 which are engaged by rollers 132 and 134 (see FIGURE 3) of roller bracket devices 136 which are affixed in spaced relation to the respective beams 112. As indicated in FIGURE 3, the respective rollers 132 and 134 engage opposite edges 138 and 140 of the guide bars 130.

The sides of the yoke beams 126 and 128 that oppose each other are provided with pairs of roller guide bars 142 which are engaged by the respective rollers 144 and 146 (see FIGURE 3) of roller bracket devices 148 that are fixed to the ends of bridge or cross beam 66A.

The top beam 122 of the yoke or frame 50A supports hydraulic cylinder device 62A provided with piston rod 64A that is connected to cross beam or bridge structure 66A by a suitable connection device 150 consisting of flanged elements 151 and 153 secured together by bolts 155. The roller 68A is formed with a groove 152 proportioned to receive the top edge 69 of the web, and roller 68A is suitably journalled in pillow block bearing units 154 affixed to suitable mounting base 156 that is in turn appropriately fixed to the cross beam 66A. Appropriate brace bars 158 are applied between the roller bracket devices 148 and the mounting base 156 for reinforcing purposes.

The hydraulic cylinder 62A may have its piston rod 64A directly connected to the cross beam 66A as indicated in the upper portion of FIGURE 4, or, for smaller web widths, the telescoping adapter device 160 may be employed, which is shown in the dashed line showing of FIGURE 4 and comprises a plurality of tubular sections 162, 164, and 166 arranged in telescoping arrangement and provided with a plurality of adjustment holes 168, which may be aligned for the respective overlapping or telescoping of the respective tubes 162, 164 and 166 (as may be necessitated by the width of the web being processed) for application of locking pins 170 and 172, respectively. The device 160 has flanged end portions 174 and 176 for connection to the flange portions 151 and 153, respectively, of the connection device 150, the latter being affxed to the piston rod 64A and cross beam 66A, respectively.

The top beam 114 of frame 110 is made up of a pair of channel members 182 that are spaced apart and are oppositely disposed (see FIGURE 3), and the hydraulic cylinder 62A extends upwardly between them. Members are suitably reinforced by tie plates 183 or the like.

The knurled drive roller 58A is journalled between pillow block bearing unit 184 and hydraulic motor device 186 of any appropriate kind, both of which are mounted in any suitable manner on the bottom beam 124 of the yoke or frame 50A.

Extending rearwardly of the direction of movement of the beam through yoke or frame 50A (see arrow 22A of FIGURE 3) are a pair of diagonally disposed support plates 190 (see FIGURE 5) which at their ends mount a pair of post structures 192 that extend upwardly to the top beam 122 of yoke 50A where they are connected to brace plates 194 (see FIGURES 3 and 4). Secured to each post structure 192, at the approximate position illustrated by rollers 72 of FIGURE 2, are roller support bracket structures 198, each of which mount a roller frame 200 journalling the respective rollers 72A. As indicated in FIGURE 3, the respective roller frames 200 are each provided with a pair of guide bars 202 which are slidably received in correspondingly located holes formed in the respective roller brackets 198, for purposes of guiding the movement of the rollers 72A laterally of the path of movement of the I-beam components.

Each roller frame 200 has connected thereto a piston rod 204 of a hydraulic cylinder 206 that is affixed between the respective roller frames and the respective post structures 192 for the purpose of moving the respective rollers 72A toward and away from each other. Suitable hydraulic control may be provided for controlling the operation of hydraulic cylinders 206 to clamp the respective pairs of rollers 72A against the I-beam web 70.

The support plates 190 also support a pair of oppositely disposed end flange centering hydraulic cylinders 210 and 212 which are secured to mounting brackets 214 (see FIGURES 5 and 6) that are in turn mounted in any suitable manner on plates 190. The brackets 214 are positioned in opposed spaced apart relation and support between them a pair of guide rails 216, which are secured in place as by applying nuts 218 to their threaded ends 219.

Slidably mounted on the guide rails 216 are floating roller supports 220 on which are journalled the rollers 76A that engage the side edges 63 of the end flange 60. As indicated in the drawing, rollers 76A are journalled for rotation about vertical axes, as are the rollers 72A.

Figure 6:
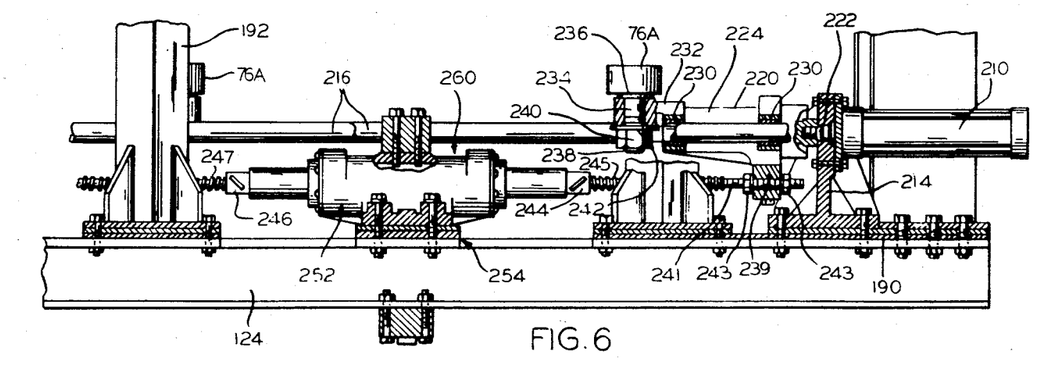
FIGURE 6 is a side elevational view of the floating yoke beam end flange edge engaging roller apparatus shown in FIGURE 5.

As indicated at the right hand side of FIGURE 6, each of the supports 220 is secured to a piston rod 222 of the respective hydraulic cylinders 210 and 212, and the hydraulic cylinders 210 and 212 are incorporated in a suitable hydraulic system for urging the piston rods 222 outwardly of their cylinders to bias the rollers 76A against the edges 63 of the end flange.

Figure 5:
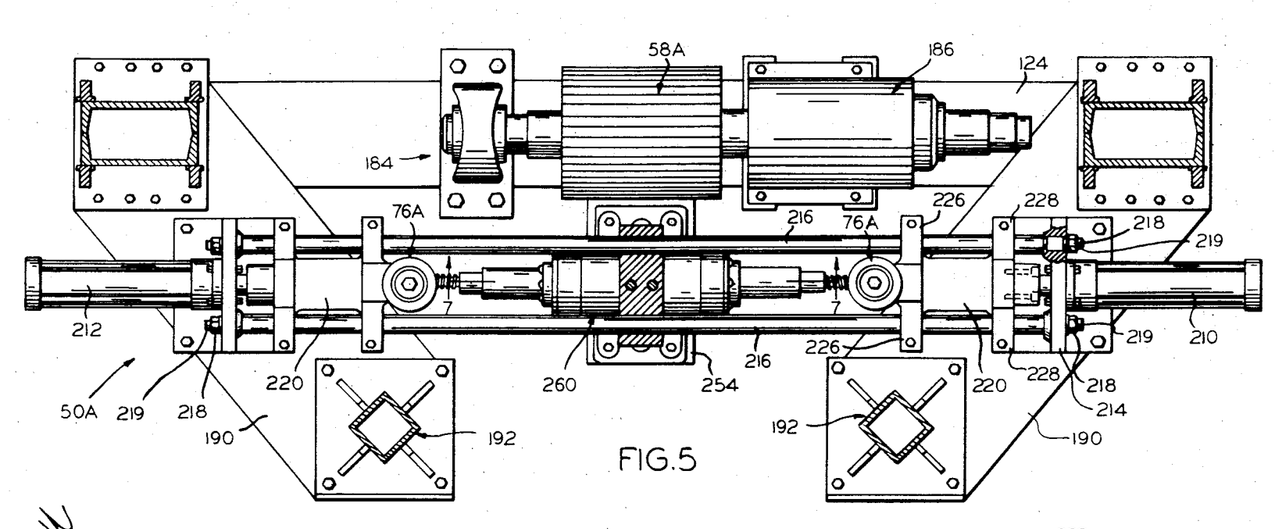
FIGURE 5 is a plan view on an enlarged scale, and partially in section, illustrating the lower end portion of the floating yoke arrangement.

As indicated in FIGURES 5 and 6, the roller supports 220 each comprise a body portion 224 formed with spaced pairs of eyes 226 and 228 in which are mounted suitable bushings 230 to provide the desired antifriction qualities between the roller support body portion 224 and the guide rails 216. The roller supports are each provided with an arm structure 232 that respectively mount shafts 234 on which the respective rollers 76A are journalled. In the form shown, the shafts 234 are each formed with a shoulder 236 and a threaded end portion 238, with a nut 240 being tightened against a lock washer 242 to draw the shoulder 236 in clamping relation with the respective arms 232 for the purpose of securely mounting the rollers 76A in place.

The roller support body portions 224 are also each formed with a depending arm structure 239 through which extends a threaded shaft or rod 241 that is fixed against movement with respect to the respective roller support body portions 224 by nuts 243.

Figures 7, 8:
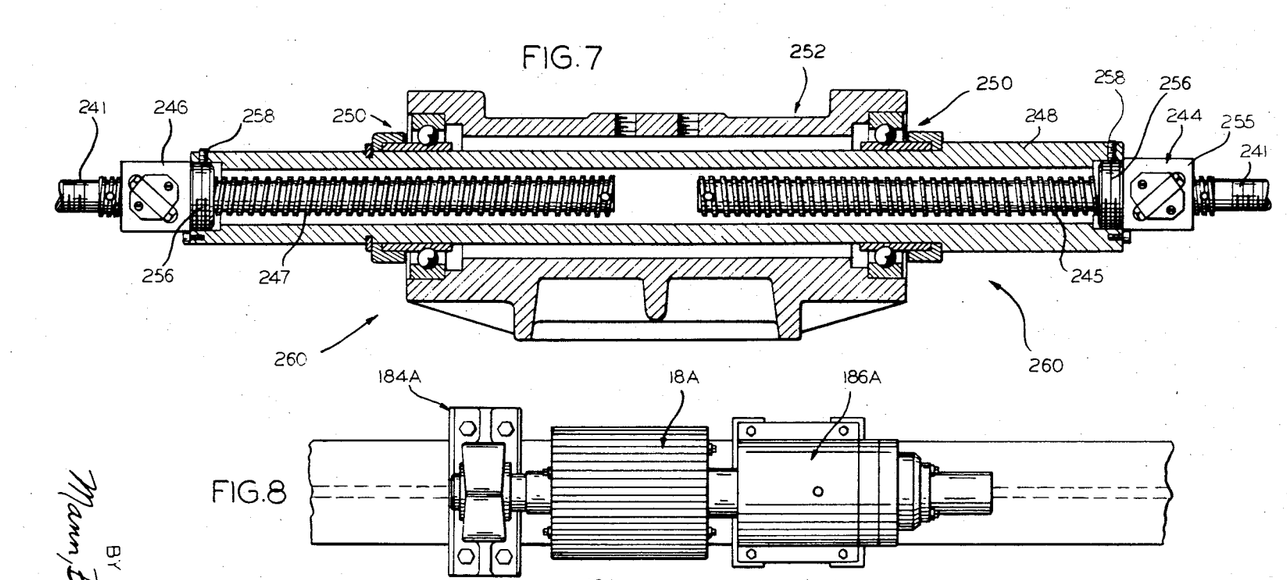
FIGURE 7 is a diagrammatic, cross-sectional view taken substantially along line 7—7 of FIGURE 5.
FIGURE 8 is a plan view of the drive roller device shown in FIGURE 5.
Figure 9:
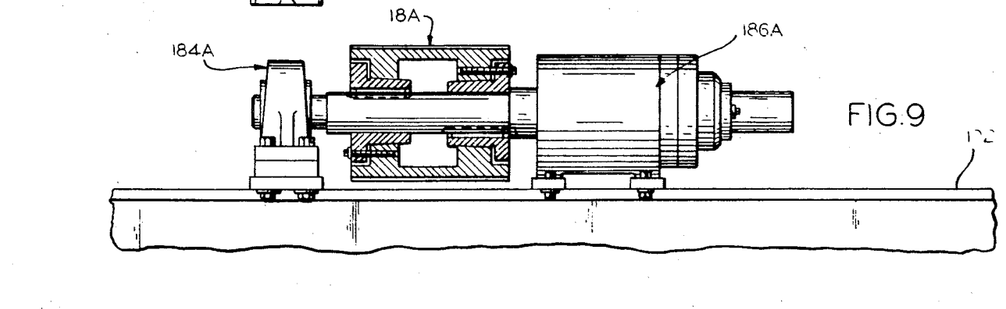
FIGURE 9 is a side elevational view of the drive roller arrangement shown in FIGURE 8 with the drive roller being shown in section.

The rods or shafts 241 are formed with reversely threaded portions 245 and 247, respectively, indicated in FIGURE 7, that are respectively threadedly received in ball nut assemblies or units 244 and 246 which are keyed to a tube 248 which is journalled by ball bearing units 250 in a pillow block mounting structure 252 that is in turn secured to a mounting plate structure 254 that is fixed to the lower floating yoke beam 124.

In the form shown, the ball nut assemblies 244 and 246 include a housing portion 255 which includes a threaded portion 256 that is threadedly received within the respective ends of the tube 248 and secured against rotation with respect thereto by set screws 258.

The ball nut assemblies 244 and 246 and their cooperating threaded rods or shafts may be of any suitable type to serve the purpose, though the Saginaw ball nut unit No. 5707535 and accompanying screw 1000–0250–C1, made by the Saginaw Steering Gear Division of General Motors Corporation, Saginaw, Mich., is one type of arrangement that will be suitable for the purpose.

The ball nut devices and their threaded rods, tube 248 and mounting structure 252 form an equalizer device 260 which functions to equalize the movement of the rollers 76A laterally of the beam path of movement as they perform their functions of centering the end flange with respect to the yoke 50A under the action of hydraulic cylinders 210 and 212. Rollers 76A are urged against the beam end flange edges by hydraulic cylinders 210 and 212 during operation of the apparatus, and, under ordinary conditions, the edges 63 of the end flange are straight and unindented along their entire lengths. However, it occasionally happens that some beam end flange designs call for indentations in the end flange edges which indentations are made substantially equal but opposite on the respective side edges of the end flange. Consequently, as an I-beam end flange of this character goes through the yoke or frame 50A, movement of the rollers 76A towards each other is transmitted to the respective rods or shafts 241 which apply a bias to the respective ball nut assemblies 244 and 246 that results in the tube 248 being rotated in the direction required to simultaneously and equally retract the rods 241 with the tube 248 (FIGURE 7 illustrating the fully retracted position). When traverse of the indentation is completed and the end flange then widens out to its maximum width, the rollers 76A are biased outwardly of each other against the action of hydraulic cylinders 210 and 212 with the result that the rods 241 are pulled outwardly of the tube 248, which in turn is rotated correspondingly to permit the rods to be withdrawn from the tube 248. The threaded engagement between the rods 241 and the respective ball nut assemblies 244 and 246 together with the fixed relation between the housings of the ball nut assemblies 244 and 246 and the tube 248 insures that the lateral movement of rollers 76A will be equal and opposite.

The welding heads are carried by yoke 50A through a floating guidance and support system of the type indicated and are located in fillet welding position approximately where indicated in FIGURE 3 by reference numeral 80A.

FIGURE 8 illustrates the drive roller 18A, the mounting and driving arrangement of which is substantially identical to that of roller 58A, as indicated in FIGURE 5. Thus, the roller 18A is journalled between a suitable pillow block bearing unit 184A and suitable hydraulic motor 186A, the latter of which is powered in any suitable manner along the lines indicated with respect to FIGURE 1 to rotate the roller 18A. Roller 18A may be of any suitable type and some suggestive details are indicated in the cross-sectional view of FIGURE 9.

The roller 18A, bearing unit 184A and hydraulic motor assembly 186A are fixed in a suitable manner on the beam 102, which, as previously indicated, is supported by a hydraulic cylinder arrangement of the type indicated in FIGURE 1 for roller 18. Beam 102, at its ends, is formed with roller mounting assemblies 270 (see FIGURE 3) on either side thereof which are provided with spaced rollers 272 that engage the respective pairs of roller guide bars 274 affixed to the respective vertical columns 276 between which the beam 102 is mounted. The roller supports 270 should contain a sufficient number of vertically aligned rollers to insure that the beam 102 will remain substantially horizontally disposed during any vertical movement of same under the weight of the beam being welded.

The drive roller 20A and beam 104 are arranged in a manner similar to that described in connection with drive roller 18A and beam 102, as indicated by corresponding reference numerals and, in the embodiment of FIGURES 3–8, rollers 18A, 20A and 58A are relied on to feed the beam components at welding speed. The rollers of conveyor 12 may be driven to bring the beam components up to engagement with roller 18A, or this may be done by towing the subassembly 61 with an overhead crane, or in any other suitable manner.

Alternately, rollers 76A may be driven in any suitable manner, and we prefer that a plurality of sets of rollers 76A and their associated equalizer devices be positioned between the spaced rollers of conveyor 12 (as indicated by the position of rollers 76A of FIGURE 1), in which case the rollers of conveyors 12 and 14 and rollers 18, 20 and 58 may be idlers and the sets of powered rollers 76A may be rolled on to feed the beam components for welding purposes.

In a modified arrangement, as the subassembly 61 moves along conveyors 12 and 14, the ends of the subassembly 61 are supported by gantry cranes riding on tracks extending parallel to and alongside of conveyors 12 and 14, and operated to move at the welding speed of subassembly 61.

The specifics of the embodiment of FIGURE 2A may be similar to those described immediately above, with appropriate changes being made to accommodate the different functions and arrangements indicated.

It will thus be seen that we have provided a method and apparatus for welding beam components together which calls for the beam components to be moved longitudinally thereof during the welding procedure, and, furthermore, the beam components are welded together when positioned in the upright position of the beam.

Furthermore, the welding is done adjacent the point where the beam components pass through a floating support guiding arrangement therefor which compensates for any camber and irregularities or variations in the beam components and permits the welding heads to remain directly applied to the desired fillets.

The specific arrangements shown in FIGURES 3–9 will take beam components with web width variations from eight inches to one hundred twenty inches and with flange width variations from eight inches to thirty inches. This machine will handle girder structures up to forty tons and one hundred sixty feet in length.

While the cylinders 32, 40 and 56 are shown arranged for single acting operation, double acting cylinder arrangements performing the functions indicated are contemplated and, of course, they may be arranged in any suitable manner, following the teachings of this application for that purpose.

While the illustrated embodiments of the invention are shown arranged for assembling I-beam shaped structures, the invention is obviously readily adapted to making box beams or columns, double webbed I-beams and applying cover plates to I-beams, as by appropriately positioning the illustrated plate engaging rollers and welding heads for proper application to the plates being assembled following the teachings of this invention. Consequently, the appended claims are not to be construed as being limited to the making of I-beams.

Some fabricated beams are designed to have the web disposed to one side of the end flange longitudinal center line. The equalizer device 260 may readily be arranged to accommodate this as well as be adapted for use in connection with the box beams and the like referred to immediately above by making the rollers 76A individually adjustable laterally (of, for instance, the yoke 50A) with respect to their control rods 241.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. Apparatus for welding together beam end flange and web components, said apparatus comprising:

conveyor means defining a feed path for moving a horizontally disposed beam end flange carrying a vetrically disposed web longitudinally thereof,
roller means interposed in said feed path for clamping the end flange to the web,
welding head means for welding the web to the flange,
means for mounting said roller means and said welding head means to float with the web and flange on movement of the web and flange relative thereto,
means for feeding said web and said flange through said roller means,
a roller for supporting said end flange in front of said roller means,
a roller for supporting said end flange at the rear of said roller means,
means for independently raising and lowering said rollers to maintain the position of the end flange and the web,
said roller raising and lowering means each comprise a hydraulic piston and cylinder means, and
means for hydraulically connecting said cylinder means together when said end flange passes over said rollers, whereby said rollers have a common hydraulic support and automatically adjust to load supporting conditions.

2. The apparatus set forth in claim 1 wherein:
said mounting means comprises a hydraulic piston and cylinder means for adjusting the position of said clamping roller means with respect to said feed path,
and means for hydraulically controlling said mounting means hydraulic piston and cylinder means to permit the floating of said roller means,
said welding head mounting means includes means for supporting same to float independently of said clamping roller means with respect to the web and flange fillets being welded.

3. The apparatus set forth in claim 2 wherein:
said clamping roller means are mounted on an open centered frame interposed in said feed path and positioned transversely thereof,
said frame carrying idler roller means engaging either side of said web,
said idler roller means including means for clamping same against the web.

4. The apparatus set forth in claim 1 including:
guide roller means engaging either edge of said end flange,
and including means for biasing said flange edge engaging roller means against said flange edges whereby end flanges having varying widths may be located in relation to the web.

5. The apparatus set forth in claim 4 including:
means for equalizing the movements of said flange edge engaging roller means on either edge of said end flange whereby end flanges including those having varying widths may be located in relation to the web.

6. The apparatus set forth in claim 3 wherein:
said clamping roller means comprises opposed rollers,
a bridge member carried by said frame and movable vertically with respect thereto,
means for raising and lowering said bridge member with respect to said frame,
one of said clamping roller means being carried by said bridge member and positioned to be biased against the web upper edge on operation of said bridge member raising and lowering means to clamp said end flange to said web.

7. The apparatus set forth in claim 6 wherein:
said frame is mounted to float with said clamping roller means and is actuated by said mounting means hydraulic piston and cylinder means.

8. The apparatus set forth in claim 6 wherein:
said frame is stationary with respect to said feed path, and the other of said clamping roller means is actuated by said mounting means hydraulic piston and cylinder means.

References Cited

UNITED STATES PATENTS

| | | | |
|---|---|---|---|
| 1,831,343 | 11/1931 | Caldwell | 219—124 |
| 2,179,802 | 11/1939 | Sykes | 219—102 |
| 3,154,665 | 10/1964 | Dunning et al. | 219—124 |
| 3,164,713 | 1/1965 | Banks et al. | 219—124 |
| 3,171,375 | 3/1965 | Linnander | 219—102 |
| 3,291,360 | 12/1966 | Linnander | 219—124 |
| 3,377,460 | 4/1968 | Jonsson et al. | 119—125 |

JOSEPH V. TRUHE, Primary Examiner

W. D. BROOKS, Assistant Examiner

PO-1050
(5/69)

UNITED STATES PATENT OFFICE
CERTIFICATE OF CORRECTION

Patent No. 3,469,067　　　　　　　　Dated September 23, 1969

Inventor(s) R. P. Ogden et al

It is certified that error appears in the above-identified patent and that said Letters Patent are hereby corrected as shown below:

Column 10, line 64, after "means" insert -- rollers --.
Column 10, line 75, after "means" insert -- rollers --.

SIGNED AND
SEALED
APR 28 1970

(SEAL)
Attest:

Edward M. Fletcher, Jr.
Attesting Officer

WILLIAM E. SCHUYLER, JR.
Commissioner of Patents